(12) United States Patent
Petzold et al.

(10) Patent No.: US 12,007,765 B2
(45) Date of Patent: Jun. 11, 2024

(54) METHOD FOR ASSISTING A USER IN THE REMOTE CONTROL OF A MOTOR VEHICLE, COMPUTER PROGRAM PRODUCT, REMOTE-CONTROL DEVICE AND DRIVER ASSISTANCE SYSTEM FOR A MOTOR VEHICLE

(71) Applicant: Valeo Schalter und Sensoren GmbH, Bietigheim-Bissingen (DE)

(72) Inventors: Johannes Petzold, Kronach Neuses (DE); Joerg Schrepfer, Bietigheim-Bissingen (DE); Stefan Milz, Kronach Neuses (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 448 days.

(21) Appl. No.: 17/311,185

(22) PCT Filed: Nov. 21, 2019

(86) PCT No.: PCT/EP2019/082007
§ 371 (c)(1),
(2) Date: Jun. 4, 2021

(87) PCT Pub. No.: WO2020/114785
PCT Pub. Date: Jun. 11, 2020

(65) Prior Publication Data
US 2022/0035368 A1    Feb. 3, 2022

(30) Foreign Application Priority Data

Dec. 6, 2018 (DE) ...................... 10 2018 131 104.4

(51) Int. Cl.
*G05D 1/00* (2006.01)
*B60K 35/00* (2006.01)
(Continued)

(52) U.S. Cl.
CPC ........... *G05D 1/0038* (2013.01); *B60K 35/00* (2013.01); *G05D 1/0044* (2013.01); *B60K 35/22* (2024.01);
(Continued)

(58) Field of Classification Search
CPC ............... G05D 1/0038; G05D 1/0044; G05D 2201/0213; B60K 35/00; B60K 2370/176; B60K 2370/55
(Continued)

(56) References Cited

U.S. PATENT DOCUMENTS

| 5,596,319 A | * | 1/1997 | Spry ..................... G05D 1/0276 180/68.1 |
| 2008/0027591 A1 | * | 1/2008 | Lenser .................. G06F 3/0412 701/28 |

(Continued)

FOREIGN PATENT DOCUMENTS

| DE | 102006026092 A1 | 12/2007 |
| DE | 102007024752 A1 | 11/2008 |

(Continued)

OTHER PUBLICATIONS

English Translation for DE-102011082475-A1 (Year: 2023).*

(Continued)

*Primary Examiner* — Mahmoud S Ismail
(74) *Attorney, Agent, or Firm* — Osha Bergman Watanabe & Burton LLP

(57) ABSTRACT

A method for assisting a user in the remote control of a motor vehicle by a remote-control device is disclosed. Depending on sensor data provided by means of at least one environment sensor of the motor vehicle, a first surroundings image of at least one part of the surroundings of the motor vehicle from a determined perspective is provided and displayed by means of the remote-control device. In this (Continued)

Figure 1:
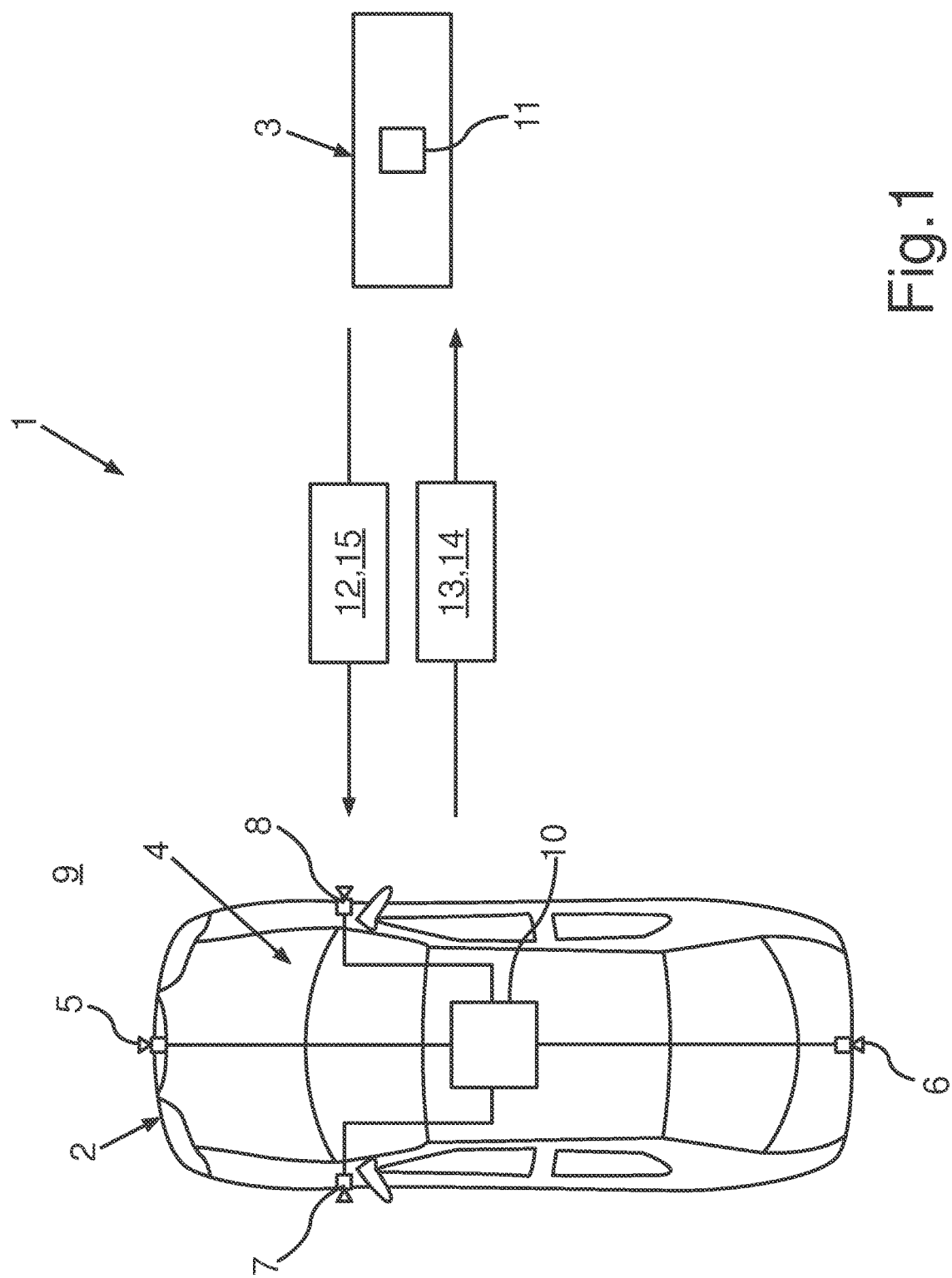

case, the determined perspective is selected from a number of selectable perspectives as a perspective that is independent of a position of the at least one environment sensor, depending on a user input effected by the user and detected by means of the remote-control device.

14 Claims, 2 Drawing Sheets

(51) Int. Cl.
　　*B60K 35/22* (2024.01)
　　*B60K 35/28* (2024.01)
　　*B60K 35/80* (2024.01)
(52) U.S. Cl.
　　CPC .............. *B60K 35/28* (2024.01); *B60K 35/80* (2024.01); *B60K 2360/1523* (2024.01); *B60K 2360/176* (2024.01); *B60K 2360/55* (2024.01)
(58) Field of Classification Search
　　USPC ............................................................ 701/2
　　See application file for complete search history.

(56) References Cited

U.S. PATENT DOCUMENTS

| 2009/0309970 | A1 | 12/2009 | Ishii et al. | |
|---|---|---|---|---|
| 2010/0292868 | A1* | 11/2010 | Rotem | G05D 1/0038 |
| | | | | 701/2 |
| 2012/0069188 | A1* | 3/2012 | Ohno | G08G 1/167 |
| | | | | 348/148 |
| 2015/0127208 | A1* | 5/2015 | Jecker | B62D 15/0285 |
| | | | | 701/23 |
| 2016/0096549 | A1 | 4/2016 | Herzog et al. | |
| 2017/0195564 | A1 | 7/2017 | Appia et al. | |
| 2018/0299900 | A1* | 10/2018 | Bae | G06V 10/751 |
| 2019/0204830 | A1 | 7/2019 | Ogura | |

FOREIGN PATENT DOCUMENTS

| DE | 102008034606 | A1 | | 1/2010 | |
|---|---|---|---|---|---|
| DE | 102009041587 | A1 | | 3/2011 | |
| DE | 102011082475 | A1 | * | 3/2013 | ............ B60K 35/00 |
| DE | 102011082475 | A1 | | 3/2013 | |
| DE | 102011084524 | A1 | | 4/2013 | |
| DE | 102012007986 | A1 | | 10/2013 | |
| JP | 2003-195941 | A | | 7/2003 | |
| JP | 2014-065392 | A | | 4/2014 | |
| JP | 2014-197817 | A | | 10/2014 | |
| JP | 2016-074285 | A | | 5/2016 | |
| JP | 2017-225062 | A | | 12/2017 | |
| JP | 2018-062223 | A | | 4/2018 | |
| JP | 2018-106676 | A | | 7/2018 | |

OTHER PUBLICATIONS

Mark Harris; "CES 2018: Phantom Auto Demonstrates First Remote-Controlled Car on Public Roads" Jan. 10, 2018; URL: https://spectrum.ieee.org/cars-that-think/transportation/self-driving/ces-2018-phantom-auto-demonstrates-first-remotecontrolled-car-on-public-roads (4 pages).
International Search Report and Written Opinion in corresponding International Application No. PCT/EP2019/082007, dated Mar. 20, 2020 (13 pages).
German Search Report issued in corresponding German Application No. 10 2018 131 104.4, dated Oct. 14, 2019 (6 pages).
The Notification of Reason for Rejection issued in Japanese Patent Application No. 2021-532038, dated Dec. 13, 2022 (8 pages).
European Office Action issued in European Application No. 19828567.8 dated Feb. 20, 2023 (7 pages).
Notification of Reason for Rejection issued in Japanese Patent Application No. 2021-532038, dated Jun. 17, 2022 (9 pages).

\* cited by examiner

METHOD FOR ASSISTING A USER IN THE REMOTE CONTROL OF A MOTOR VEHICLE, COMPUTER PROGRAM PRODUCT, REMOTE-CONTROL DEVICE AND DRIVER ASSISTANCE SYSTEM FOR A MOTOR VEHICLE

BACKGROUND OF THE INVENTION

The invention relates to a method for assisting a user in the remote control of a motor vehicle by means of a remote-control device, wherein depending on sensor data provided by means of at least one environment sensor of the motor vehicle a surroundings image of at least one part of the surroundings of the motor vehicle from a determined perspective is provided and the first surroundings image is displayed by means of the remote-control device. The invention also includes a computer program product, a remote-control device and a driver assistance system for a motor vehicle.

Various remote-control systems for the remote control of a motor vehicle are known from the prior art. Firstly, there are systems here in which the user must be situated in predetermined proximity to the motor vehicle for the purpose of remote control of the motor vehicle, in particular in such a way that the motor vehicle is in visual range with respect to the user. Such systems are principally used in connection with parking processes which are carried out automatically by the motor vehicle and in which a user outside the motor vehicle can start and monitor such an automatic parking process by way of a remote control.

In this connection, US 2016/0096549 A1 describes a method for the remote control of a motor vehicle with a trailer. In that case, a user can drive in a remote-controlled manner by means of a remote control the motor vehicle/trailer arrangement. To that end, corresponding control elements can be provided, in particular also as a virtual display of such control elements, by the remote control in order to remotely control for example the accelerator pedal, the brake pedal, a gear selector lever and so on. Furthermore, in that case, a video stream of a 360 degrees all-round view system of the motor vehicle can also be displayed to a user.

Furthermore, DE 10 2009 041 587 A1 describes a method for assisting a driver in monitoring an autonomous parking process of a motor vehicle, wherein the monitoring user can likewise be situated outside the motor vehicle during the autonomous parking process. In that case, too, by means of at least one camera of the motor vehicle, image data regarding a surroundings region of the motor vehicle can be obtained and these image data or image data calculated therefrom can be communicated to a remote control of the user for display. If a plurality of cameras are provided, the user can select one of the plurality of cameras by way of the remote control and the image data of the selected camera are then displayed to the user by means of the remote control. Alternatively, the views of the different cameras can also be automatically displayed to the user in a predetermined temporal alternation by way of the remote control. A further alternative provides for the surroundings region of the motor vehicle to be displayed to the driver from a bird's eye perspective by means of the remote control.

Furthermore, there are also remote-control systems in which the user does not have to be situated in predetermined proximity to the motor vehicle, but rather can also be very far away from the motor vehicle, for example in a different city, or even in a different country. Such a system is described for example in the article "CES 2018: Phantom Auto Demonstrates First Remote-Controlled Car on Public Roads" by Mark Harris, published on 10 Jan. 2018 under https://spectrum.ieee.org/cars-that-think/transportation/self-driving/ces-2018-phantom-auto-demonstrates-first-remote-controlled-car-on-public-roads". In that case, too, the video of the surroundings recorded by a motor vehicle camera can be displayed as a livestream to a distant user controlling the motor vehicle by remote control.

Precisely in the case mentioned last, i.e. the case in which a user, under certain circumstances, can be very far away from the motor vehicle to be remote-controlled, it is particularly important, for the case where the user has to remotely control this motor vehicle from a distance, to supply the user with comprehensive information about the surroundings of the motor vehicle.

In general, moreover, motor vehicles that drive with a high level of automation are already known from the prior art. In this context, motor vehicles of a variety of autonomy levels are being tested in the meantime. However, it is foreseeable that a stage 5 autonomy level, i.e. a level at which a driver or a monitoring person need no longer be present at all, will not be implementable at least in the near future. Currently, therefore, even motor vehicles having very high autonomy levels may nevertheless encounter situations in which manual interaction by a user is required. These situations may constitute critical manoeuvres, for example, such as motorway exits, merging lanes, accidents, the provision of a corridor for vehicles of the emergency services, roadworks, or else simpler driver takeovers for parking in a parking gap or in multistorey car parks. Such kinds of manual takeover by a user of the automatically driving motor vehicle also allow the control of the motor vehicle that is carried out by the user to be effected remotely. In this case, such a takeover may be necessary either when the motor vehicle is at a standstill or during slow driving, such as during a parking manoeuvre, for example, but on the other hand also in thoroughly more critical situations when the motor vehicle is travelling rapidly, for example on a motorway. It is therefore desirable to make such a takeover as easy as possible and overall as safe as possible for the user.

BRIEF SUMMARY OF THE INVENTION

Therefore, it is an object of the present invention to provide a method for assisting a user in the remote control of a motor vehicle by means of a remote-control device, a computer program product, a remote-control device and a driver assistance system for a motor vehicle which allow the safest possible remote control of the motor vehicle by the user who is external to the motor vehicle and situated at a distance.

This object is achieved by means of a method for assisting a user in the remote control of a motor vehicle, by means of a computer program product, by means of a remote-control device and by means of a driver assistance system having the features according to the respective independent patent claims. Advantageous configurations of the invention are the subject matter of the dependent patent claims, the description and the figures.

In a method according to the invention for assisting a user in the remote control of a motor vehicle by means of a remote-control device, depending on sensor data provided by means of at least one environment sensor of the motor vehicle a first surroundings image of at least one part of the surroundings of the motor vehicle from a determined perspective is provided and the first surroundings image is displayed by means of the remote-control device. Furthermore, the determined perspective is selected from a plurality of selectable perspectives as a perspective that is independent of a position of the at least one environment sensor, depending on a user input effected by the user and detected by means of the remote-control device.

In other words, the perspectives which are selectable by the user by means of the remote-control device and from which the corresponding surroundings image of the surroundings of the motor vehicle can be displayed to the user are not restricted to the perspectives provided by the positions of the one or more environment sensors of the motor vehicle, but rather can for example in principle be freely selectable in three-dimensional space. The view or representation of the surroundings from the selected perspective can then be calculated by known methods from the sensor data provided by the at least one environment sensor. As a result, the user is advantageously provided with significantly more flexibility with regard to the selection of the perspective of the motor vehicle surroundings, as a result of which, precisely in combination with a remote-control system in which the user has to remotely control the motor vehicle from a distance in very critical driving situations, under certain circumstances, safety can be increased enormously since as a result of the significantly more flexible selection of the perspective, what can be displayed to the user is a surroundings image which can be selected by the user in a manner suitably adapted to the requirements of the situation and in this case is not restricted to a defined number of predetermined perspectives, in particular predetermined by the positions of the motor vehicle sensors.

In this case, remote control of the motor vehicle can be understood to mean both remote activation of a function that is to be carried out automatically by the motor vehicle, and manual remote-controlled driving of the motor vehicle. Preferably, the motor vehicle to be remote-controlled is an automatically driving motor vehicle, in particular at autonomy level two, three or four. Preferably, remote control of the motor vehicle by the user takes place only in a takeover situation, that is to say when the motor vehicle that is currently driving automatically requests that the user take over the driving functions. This may be the case in the situations described in the introduction.

In connection with the present invention, during the remote control of the motor vehicle, the user does not have to be situated in predetermined proximity to the motor vehicle, but rather can be at an arbitrary distance from the motor vehicle. Moreover, the motor vehicle does not have to be in the visual range of the user. In this case, the communication between the motor vehicle and the remote-control device can be effected in principle by any arbitrary communication standard, preferably by a mobile radio standard. At the present time, primarily the mobile radio standard 4G or LTE (Long Term Evolution), in particular LTE-advanced, is particularly suitable for this. At the present time, it is thereby possible to achieve the highest data transfer rates and to minimize latencies as a result. In the future, however, it will also be possible to use other, further improved mobile radio standards, such as, for example, the planned mobile radio standard 5G or other standards for data transfer between the motor vehicle and the remote-control device.

Furthermore, the remote-control device can assume arbitrary forms. It can be configured for example as a mobile device, such as, for example, as a smartphone or some other mobile communication device, or else as a non-mobile communication device, such as, for example, a desktop computer or home computer of the user. For displaying the at least one first surroundings image, the remote-control device comprises at least one display device or display.

The at least one environment sensor is preferably embodied as at least one camera. For environment detection and for providing the sensor data, however, alternatively or additionally other types of sensor can also be used, for example LIDAR (Light Detection And Ranging) sensors and/or radar sensors and/or ultrasonic sensors and arbitrary combinations thereof.

In order to make the surroundings representable for the user from any selected perspective desired, it is preferred, as will be described in greater detail later, for a 3D all-round view around the motor vehicle to be able to be provided on the basis of the detected sensor data. This can be made possible either by a single environment sensor or by a plurality of environment sensors. By way of example, a 360 degrees camera and/or a 360 degrees LIDAR sensor can be installed on the roof of the motor vehicle in order to detect the surroundings around the motor vehicle in a perigon. It is preferred, however, for the sensor data to be provided using a plurality of environment sensors, in particular a plurality of cameras, which are arranged on the exterior around the motor vehicle, for example a front camera at the front of the vehicle, a rear camera at the rear of the vehicle and also for example a left mirror camera in the region of the left exterior mirror of the motor vehicle and a right mirror camera in the region of the right exterior mirror of the motor vehicle. A respective one of these cameras is preferably embodied as a wide-angle camera, in particular as a fisheye camera. A respective camera can be designed to provide a field of view having an aperture angle of 180 degrees in the horizontal. Such an arrangement also makes it possible to detect the surroundings of the motor vehicle in a perigon around the motor vehicle and, on the basis thereof, to produce a 3D all-round view around the motor vehicle by merging and fusing the camera image data of the respective cameras that are assigned to a common detection time step.

In this case, a perspective can firstly be assigned a viewpoint, in particular a virtual viewpoint, from which the surroundings are intended to be viewed, and also a viewing direction. Furthermore, a perspective that is independent of a position of the at least one environment sensor should be understood to mean a perspective whose assigned viewpoint can also be different from a position of the at least one environment sensor. By way of example, the user can thus also select perspectives that do not correspond to the perspectives from which the respective motor vehicle cameras record the surroundings.

Furthermore, the detected user input for selecting the perspective can constitute a user input provided solely for selecting the perspective. In other words, a user can select or else change a perspective without the position and/or orientation of the motor vehicle itself having to be changed by remote control for this purpose. A determined perspective within the motor vehicle coordinate system can thus be chosen or changed by the user input.

In one advantageous configuration of the invention, depending on the selected perspective a view window on a defined projective surface is determined and the first surroundings image is calculated as part of a 3D all-round view around the motor vehicle, said 3D all-round view being able to be provided from the sensor data, depending on the determined view window on the defined projective surface, such that the first surroundings image represents the part of the surroundings that lies within the view window from the selected perspective.

In this regard, for example, the sensor data provided, from the viewpoint of the selected perspective, can be projected onto the defined projective surface and, as a result, the surroundings image can advantageously be provided as part of the entire 3D all-round view providable around the motor vehicle within the determined view window. The projective surface can constitute a plane, for example, which extends perpendicularly to the vertical axis of the vehicle and lies below the motor vehicle in relation to the vertical axis of the vehicle. Such a projective surface is particularly suitable for representing the surroundings from the bird's eye perspective or in a plan view of the motor vehicle.

It is particularly advantageous, however, if the projective surface constitutes a curved surface. The projective surface can be embodied in a hemispherical or shell-shaped fashion, for example. Moreover, the projective surface can be provided as a composition made from a circular plane and a shell-shaped surface extending around the plane. This provides a significantly higher degree of flexibility since, in this way, the perspective can be selected in principle at any arbitrary location in three-dimensional space and from the selected perspective it is possible to provide a three-dimensional image of the surroundings as part of the 3D all-round view.

By way of example, a virtual viewpoint assigned to the determined perspective can be freely selectable on one or a plurality of predetermined lines or in three-dimensional space. Consequently, by means of the user input detected by the remote-control device, the user can freely select the perspective and change it arbitrarily, in particular dynamically and continuously. Consequently, in principle innumerable different perspectives, in particular an infinite number thereof, can be suitably selected in a manner adapted to the respective situation.

In particular, in this case, a virtual viewpoint assigned to the determined perspective is selectable inside the motor vehicle and also outside the motor vehicle. It is thus possible to select for example a perspective such as a driver sitting in the motor vehicle would have of the surroundings, and also as many perspectives as desired outside the motor vehicle such as an observer situated next to, behind, in front of or above the motor vehicle would have. The user is thus advantageously provided with the possibility of enabling the environment information detected by the motor vehicle to be comprehensively displayed to the user.

In a further advantageous configuration of the invention, in the first surroundings image at least one part of a motor vehicle representation of the motor vehicle is represented from the selected perspective. Said motor vehicle representation can be provided for example in the form of a 2D bitmap image or alternatively as a three-dimensional computer-generated motor vehicle model. The degree of realism for the user is significantly increased as a result. Primarily, however, the user can thereby directly relate the surroundings represented in the first surroundings image and objects situated in said surroundings to the position of the motor vehicle and register for example distances, size relationships, the current direction of travel or the like significantly better and, as a result, safety can be increased further.

In a further advantageous configuration of the invention, the first surroundings image is calculated from the sensor data by the motor vehicle and communicated to the remote-control device. This has the major advantage that it is thereby possible to save computing power on the part of the remote-control device, which enables a particularly compact configuration of the remote-control device as a mobile device, for example. Moreover, this configuration has the major advantage that, by this means, the data to be communicated from the motor vehicle to the remote-control device can be reduced to a minimum since, by this means, only the image data of the surroundings image are communicated to the remote-control device, and not for example sensor data or surroundings data lying outside the determined view window, as has been descried above. This enables a significantly faster data communication from the motor vehicle to the remote-control device. It is thereby possible to reduce latencies to a minimum. In this case, it is advantageous if the user input for selecting the perspective, said user input being detected by means of the remote-control device, is communicated as, for example, corresponding selection information from the remote-control device to the motor vehicle. The latter can then accordingly calculate the surroundings image on the basis of the detected sensor data according to the selected perspective and communicate it to the remote-control device. This process is repeated here in particular continuously, such that repeatedly updated first surroundings images from the selected perspective are displayed to the user in the form of a live video on the remote-control device.

In a further advantageous configuration of the invention, the sensor data are communicated from the motor vehicle to the remote-control device and the first surroundings image is calculated from the sensor data by the remote-control device. This makes it possible, as will be explained in greater detail later, for example from the sensor data communicated to the remote-control device, to calculate and display surroundings images from different perspectives simultaneously. In principle, it would also be conceivable to enable these different surroundings images, that is to say from the different perspectives, also to be calculated in the motor vehicle directly on the basis of the sensor data and to communicate them to the remote-control device, but the computing capacity in motor vehicles is typically severely limited, in particular on account of the only limited structural space available in the motor vehicle. By contrast, such restrictions do not apply to the remote-control device, which for example can also be embodied as a home computer with high computing power. Consequently, for example, besides the first surroundings image from the perspective selected by the user, it is thus possible to represent further surroundings images from other perspectives simultaneously, without this requiring more computing power on the part of the motor vehicle. In this case, it is also not necessary to communicate the user input for selecting the perspective, said user input being detected by the remote-control device, in the form of selection information to the motor vehicle.

In one particularly advantageous configuration of the invention, the fact of whether the first surroundings image is calculated from the sensor data by the motor vehicle or by the remote-control device is determined depending on a type of the communication connection between motor vehicle and remote-control device and/or a bandwidth and/or a data transfer rate of the data transfer between motor vehicle and remote-control device. In other words, the two variants described above can be implemented in a manner governed by the situation depending on the current connection quality of the communication connection between the motor vehicle and the remote-control device. Since at least the motor vehicle moves, from time to time the communication connection can thus be better or worse. If high data transfer rates are currently available, for example, then the entire raw sensor data detected by the motor vehicle can be communicated to the remote-control device, which, from these sensor data, calculates the first surroundings image and preferably further surroundings images from further perspectives and displays them to the user. By contrast, if the communication connection between the motor vehicle and the remote-control device is currently poor or only very low data transfer rates are available, then instead the motor vehicle can calculate the first surroundings image on the basis of the detected sensor data and depending on the perspective selected by the user and can communicate it to the remote-control device, whereby the quantities of data to be communicated can be enormously reduced. Consequently, data transfer and communication between the motor vehicle and the remote-control device that are adapted to the current communication connection quality are thus advantageously possible.

Accordingly, in what is thus a further particularly advantageous configuration of the invention, if the bandwidth of the communication connection and/or the data transfer rate of the communication connection between motor vehicle and remote-control device fall(s) below a predetermined limit value, the first surroundings image is calculated from the sensor data by the motor vehicle and communicated to the remote-control device, and if the bandwidth of the communication connection and/or the data transfer rate of the communication connection between motor vehicle and remote-control device do(es) not fall below the predetermined limit value, the sensor data are communicated to the remote-control device and the first surroundings image is calculated from the sensor data by the remote-control device.

As already mentioned, it is furthermore particularly advantageous if depending on the sensor data at least one second surroundings image from a second perspective is provided and displayed simultaneously with the first surroundings image by means of the remote-control device. It is thus advantageously possible to present to the user surroundings images from different perspectives simultaneously. A user can thus be supplied with even more comprehensive surroundings information at a respective given point in time. In this case, the perspective assigned to the second surroundings image can likewise be selectable or changeable by the user or else be fixedly prescribed. By way of example, in addition to the first surroundings image with the perspective selected by the user, a plan view image from the bird's eye perspective of the motor vehicle and the motor vehicle surroundings can be represented as the second surroundings image, and/or a further second surroundings image from a driver's perspective or the like. No limits are imposed here on the configuration possibilities. By way of example, in the case of a plurality of surroundings images represented simultaneously, it is also possible from the outset, by way of the user, for the perspectives assigned to the surroundings images respectively displayed to be set in advance by a user by means of a configuration menu. For each individual surroundings image, the user can then for example also change the set perspective again at any time.

As already described, it is furthermore preferred that, in accordance with a further advantageous configuration of the invention, remote control of the motor vehicle is carried out or is able to be carried out independently of a distance between the remote-control device and the motor vehicle. Therefore, the user need not be situated in predetermined proximity to the motor vehicle, but rather, for the remote control of the motor vehicle, can be situated at a user position that is independent of the position of the motor vehicle. Precisely in connection with such remote control, it is particularly important for the user to be provided with comprehensive surroundings information since, under certain circumstances, the user cannot see the vehicle and its surroundings directly at all, in particular in contrast to other remote-control systems in which the user is situated in predetermined proximity to the motor vehicle, such that the motor vehicle is also always in visual range of the user. Such comprehensive information provision concerning the surroundings of the motor vehicle can advantageously be provided by the invention, which significantly increases safety precisely with regard to such remote-control systems which are distance-independent.

Furthermore, the invention also relates to a computer program product, comprising instructions which, when executed by a processor of an electronic control device, cause said processor to carry out a method according to the invention or one of its embodiments.

Furthermore, the invention also relates to a remote-control device for assisting a user in the remote control of a motor vehicle, wherein the remote-control device is designed to display a surroundings image of at least one part of the surroundings of the motor vehicle from a determined perspective, said surroundings image being provided depending on sensor data provided by means of at least one environment sensor of the motor vehicle. Furthermore, the remote-control device is designed to detect a user input effected by the user and, depending on the detected user input, to select the determined perspective from a plurality of selectable perspectives as a perspective that is independent of a position of the at least one environment sensor.

Furthermore, the invention also includes a driver assistance system for a motor vehicle for assisting a user in the remote control of the motor vehicle by means of a remote-control device, wherein the driver assistance system is designed, depending on sensor data provided by means of at least one environment sensor of the motor vehicle, to provide a first surroundings image of at least one part of the surroundings of the motor vehicle from a determined perspective and to communicate said surroundings image to the remote-control device for displaying the first surroundings image. Furthermore, the driver assistance system is designed to receive from the remote-control device selection information dependent on a user input effected by the user and detected by means of the remote-control device and, depending on the received selection information, to select the determined perspective from a plurality of selectable perspectives as a perspective that is independent of a position of the at least one environment sensor.

The advantages mentioned with regard to the method according to the invention and its embodiments apply in the same way to the computer program product according to the invention, the remote-control device according to the invention and the driver assistance system according to the invention. Moreover, the preferred embodiments described in connection with the method according to the invention enable the development of the computer program product according to the invention, of the remote-control device according to the invention and of the driver assistance system according to the invention by way of further corresponding configurations.

Moreover, the invention should also be considered to include a motor vehicle comprising a driver assistance system according to the invention or one of its configurations. Accordingly, the invention also includes a system comprising a remote-control device and a motor vehicle, wherein the system is designed for carrying out the method according to the invention or one of its embodiments.

BRIEF DESCRIPTION OF THE SEVERAL
VIEWS OF THE DRAWING(S)

Figure 2:
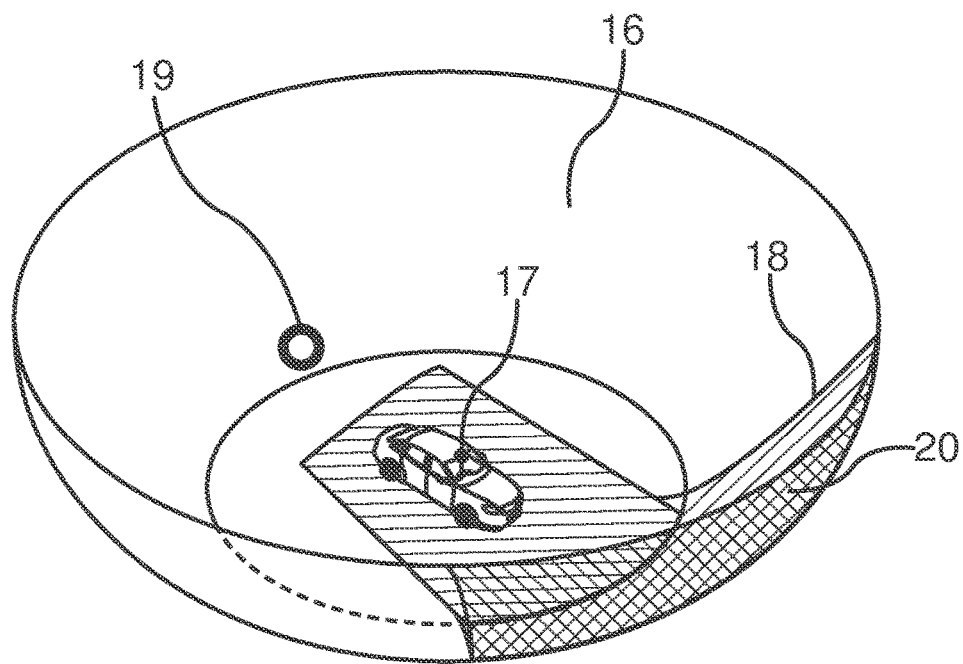
Figure 3:
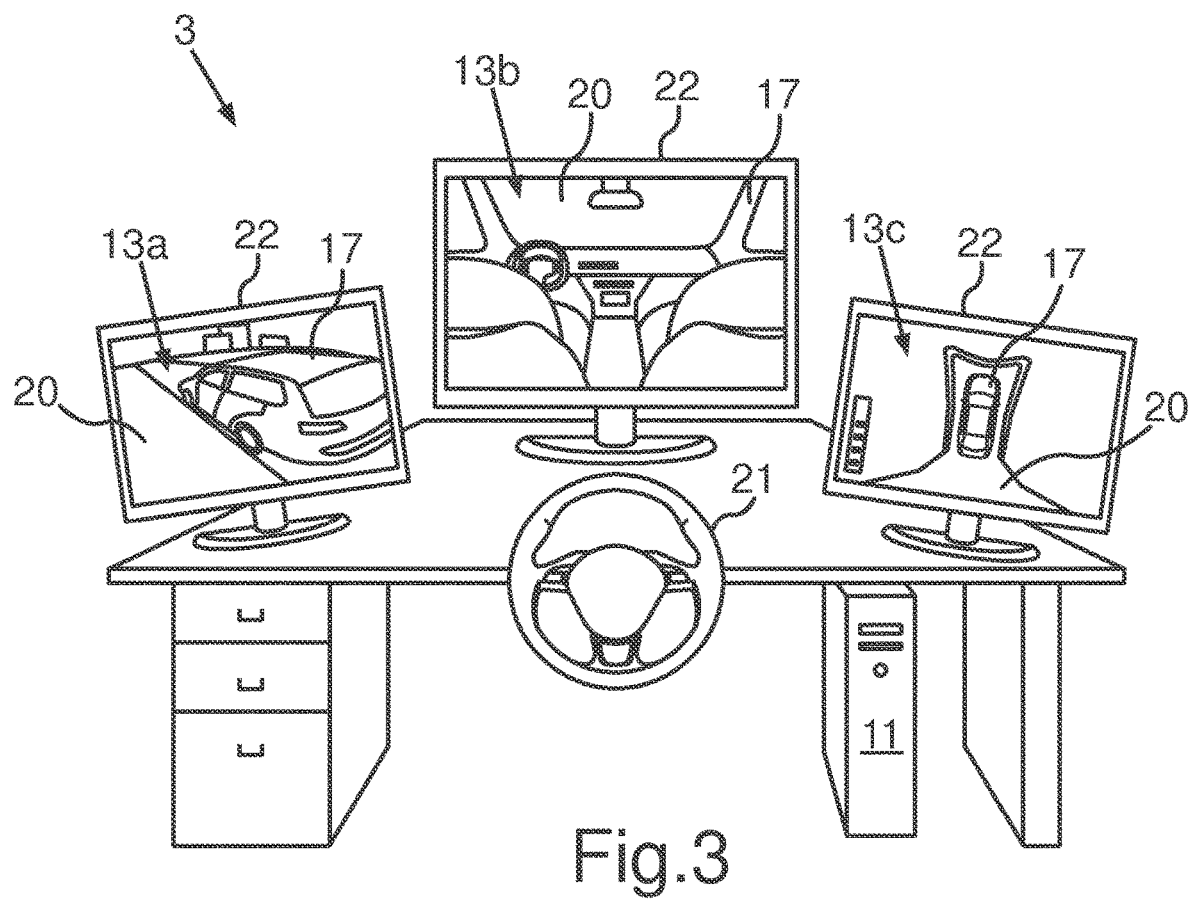

In the figures here:
FIG. 1 shows a schematic illustration of a remote-control system comprising a motor vehicle and a remote-control device in accordance with one exemplary embodiment of the invention;

FIG. 2 shows a schematic illustration of the provision of a 3D all-round view around the motor vehicle from the sensor data provided by the motor vehicle and the calculation of a surroundings image depending on a selected perspective in accordance with one exemplary embodiment of the invention; and FIG. 3 shows a schematic illustration of the remote-control device in accordance with one exemplary embodiment of the invention.

DETAILED DESCRIPTION OF THE INVENTION

FIG. 1 shows a schematic illustration of a remote-control system 1 comprising a motor vehicle 2 and a remote-control device 3 in accordance with one exemplary embodiment of the invention. In this case, the motor vehicle 2 has a driver assistance system 4 comprising at least one environment sensor, in this example four cameras 5, 6, 7, 8, namely for example a front camera 5, a rear camera 6, a left mirror camera 7 and a right mirror camera 8. Each of these cameras 5, 6, 7, 8 can be configured as a wide-angle camera. A very large field of view can therefore be detected by each of these cameras 5, 6, 7, 8. Overall, surroundings 9 of the motor vehicle 2 can thus be detected completely, that is to say in a perigon around the motor vehicle 2. On the basis of these detected sensor data, a surroundings image of at least one part of the surroundings 9 of the motor vehicle 2 from a determined perspective can be calculated and displayed on the remote-control device 3, as will be described in even more specific detail with reference to FIG. 3.

Advantageously, then, each of these perspectives is freely selectable by a user. This freely selectable perspective is thus advantageously independent of the positions of the respective cameras 5, 6, 7, 8. In other words, a perspective that does not correspond to a perspective of the respective cameras 5, 6, 7, 8 can be selected. In order to be able to select a desired perspective, the remote-control device 3 can have corresponding input means. By way of the latter, the perspective selection made by the user can be detected by the remote-control device 3.

There are then a number of possibilities for calculating the surroundings image on the basis of the detected sensor data. This calculation can be effected by the vehicle, on the one hand, and can also be carried out by the remote-control device 3 on the other hand. In the example described below, both the motor vehicle 2 and the remote-control device 3 are designed for calculating the surroundings image on the basis of the detected sensor data. For this purpose, the driver assistance system 4 has a control device 10 designed to calculate the surroundings image depending on a predefined perspective on the basis of the sensor data. On the other hand, in this example, the remote-control device 3 also has a corresponding control device 11, which is likewise designed to calculate the surroundings image on the basis of a given perspective from the sensor data provided.

If the surroundings image is intended to be calculated by the motor vehicle, then the user input for defining a desired perspective, said user input being detected by the remote-control device 3, can be communicated as corresponding selection information 12 to the motor vehicle 2, in particular to the control device 10 of the motor vehicle 2. On the basis of the image data provided by the cameras 5, 6, 7, 8 in a respective time step, the control device 10 then calculates the surroundings image 13 from the determined perspective and communicates this surroundings image, designated here by 13, in a respective time step in turn to the remote-control device 3, which displays the communicated surroundings images 13. In a respective time step, the control device 10 can calculate the surroundings image 13 on the basis of the sensor data repeatedly from the same perspective selected by the user until new selection information 12 specifying a different perspective is received from the remote-control device 3. The control device 10 of the motor vehicle 2 can then accordingly calculate the surroundings image 13 depending on the newly specified perspective and communicate said surroundings image to the remote-control device 3.

On the other hand, as mentioned, this calculation of the surroundings image 13 can also be carried out by the remote-control device 3 itself. In this case, the selection information 12 need not be communicated from the remote-control device 3 to the motor vehicle 2. Instead, in a respective time step, the control device 10 of the motor vehicle 2 communicates the image data detected by the cameras 5, 6, 7, 8, in particular as raw sensor data 14, to the remote-control device 3. In addition, even further surroundings and/or motor vehicle data, such as a surroundings map, the current motor vehicle position, the current driving speed, or other data, can also be communicated from the motor vehicle to the remote-control device. The latter then calculates the surroundings image 13 depending on the perspective selected by the user and displays said surroundings image.

It is particularly advantageous here if the determination of whether the surroundings image 13 is intended to be calculated by the motor vehicle 2 or by the remote-control device 3 is effected depending on how good the communication connection between the motor vehicle 2 and the remote-control device 3 currently is. By way of example, if a very high bandwidth is currently available for the data transfer and/or if high data transfer rates are currently made possible, then it is preferred for the motor vehicle 2, in particular the control device 10, to communicate the raw camera data 14 to the remote-control device 3 and for the calculation of the surroundings image 13 to be carried out by the remote-control device 3. This has the major advantage that the computing power of the remote-control device 3 is not limited in a manner governed by structural space, as is the case for example for the control device 10 of the motor vehicle 2. This advantageously makes it possible, on the basis of the raw camera data 14 communicated to the remote-control device 3, not only to display a single surroundings image 13 depending on the perspective selected by the user, but for example also to calculate even further surroundings images from other perspectives and to display them simultaneously.

On the other hand, if a high bandwidth is not currently available for data communication and/or if only low data transfer rates are possible, then it is preferred for the motor vehicle 2 itself to calculate the calculation of the surroundings image 13 depending on the perspective specified by the user and to communicate the calculated surroundings image 13 to the remote-control device 3, which then displays it. This has the advantage that the quantities of data that arise for the communication of the surroundings image 13 from the motor vehicle 2 to the remote-control device 3 are significantly smaller than when communicating the entire raw camera data 14. As a result, a data transfer can be carried out rapidly even at low data transfer rates.

Furthermore, additionally on the part of the remote-control device 3, remote-control commands 15 input by the user via the remote-control device 3 can also be communicated from the remote-control device 3 to the motor vehicle 2, in particular in turn to the control device 10, which implements said commands. Such remote-control commands constitute in particular driving commands to the motor vehicle 2, in particular for controlling steering of the motor vehicle 2 and/or for controlling acceleration and/or braking of the motor vehicle 2. In particular, during the remote control of the motor vehicle 2 by means of the remote-control device 3, a user is thus additionally provided with comprehensive surroundings information about the surroundings 9 of the motor vehicle 2, which significantly increases safety during the remote control of the motor vehicle 2.

FIG. 2 shows a schematic illustration of the calculation of the surroundings image on the basis of the provided sensor data as part of a 3D all-round view around the motor vehicle 2. In particular, FIG. 2 shows a projective surface, which in this example is embodied as a spherical or shell-shaped projective surface 15, together with a three-dimensional model of the motor vehicle 2 as an example of a motor vehicle representation 17. The images of the surroundings 9 detected by the motor vehicle cameras 5, 6, 7, 8 can be merged and projected onto the surface of this sphere 16. Furthermore, a determined view window 18 is defined, which depends on the position of the selected perspective 19, which is represented here by the virtual viewpoint assigned to the perspective 19. In this example, therefore, the perspective 19 is chosen so as to provide a view of the motor vehicle 2 from behind the latter, which motor vehicle is represented here by the motor vehicle model or generally a motor vehicle representation 17. In this way, it is possible to provide a surroundings image representing the first part of the surroundings 20, said first part lying within the view window, from the selected perspective 19. Exemplary surroundings images from different perspectives can be seen in FIG. 3.

In particular, FIG. 3 here shows a schematic illustration of the remote-control device 3 in detail in accordance with one exemplary embodiment of the invention. The remote-control device 3 can have operating elements 21, of which here by way of example only a steering wheel is illustrated and by means of which a user can drive the motor vehicle 2 in a remote-controlled manner. In this case, such a steering wheel or the operating elements 21 in general need not be provided as concrete objects, but rather can also be represented as a virtual representation on a display device and/or a touchscreen. Furthermore, the remote-control device 3 also provides input possibilities, which are likewise not explicitly illustrated here and by means of which a user can select the perspective from which the surroundings 9 of the motor vehicle 2 are intended to be represented by means of the remote-control device 3. The remote-control device 3 has at least one display device for representing this surroundings image.

Three display devices 22 are provided in this example. In this case, a respective display device 22 displays a respective surroundings image 13a, 13b, 13c. These surroundings images 13a, 13b, 13c can alternatively also be displayed on a common display device 22, for example next to one another, one below another, or the like. At least one of the displayed surroundings images 13a, 13b, 13c is displayed from a perspective 19 specified by the user. In this case, the other two surroundings images can be displayed either likewise from a perspective that was actively selected by the user, and/or from a predefined perspective. In this example, a first surroundings image 13a shows a part 20 of the surroundings 9 of the motor vehicle 2, which is represented here in turn as a corresponding motor vehicle representation 17, from a perspective 19 whose assigned viewpoint lies outside the motor vehicle 2 or the motor vehicle model 17. A second surroundings image 13b shows the part 20 of the surroundings 9 from a perspective whose assigned viewpoint lies inside the motor vehicle 2 or the motor vehicle model 17. In the case of the third surroundings image 13c, the part 20 of the motor vehicle surroundings 9 that lies in the view window 18 is represented from a bird's eye perspective, that is to say that the viewpoint of the perspective 19 lies directly above the motor vehicle 2 or the motor vehicle representation 17. By way of example, the perspective of the first surroundings image 13a can be freely selectable and modifiable in any desired way by the user. In addition, the two surroundings images 13b, 13c can be displayed to the user as predetermined perspectives. This is particularly advantageous since the bird's eye perspective in accordance with the third surroundings image 13c usually provides a user with comprehensive surroundings information. A perspective in accordance with the second surroundings image 13b is particularly advantageous since this simulates the perspective of a driver sitting in the motor vehicle 2, which is a particularly familiar type of representation in accordance with the user effecting remote control. This surroundings information provided is then also supplemented by the first surroundings image 13a, the perspective 19 of which is freely selectable by the user himself/herself. With regard to surroundings information which is currently particularly meaningful to the user for remote-control purposes but cannot be gathered from the other two representations, the user can then accordingly enable said information to be displayed by way of said first surroundings image through suitable selection of the perspective 19.

Consequently, it is possible to significantly increase safety during the remote control of an autonomous vehicle if the vehicle is in a situation which it cannot get out of without human aid, for example an unforeseen traffic situation not included in the programming, for example a narrow alley. A 360 degrees all-round view can be created particularly simply with the aid of fisheye cameras. This advantageously enables any arbitrary desired perspective to be selected by the user effecting remote control, the teleoperator, thereby significantly simplifying navigation by the teleoperator, precisely in particularly critical driving situations. Precisely by virtue of the fact that any arbitrary observer position can thus be adopted, for example above or behind the motor vehicle, the teleoperator can assess the current situation significantly better, which makes the remote control significantly simpler and thus safer. The teleoperator thus ultimately has the possibility of full 360 degrees perception of the remote-controlled motor vehicle. Moreover, the teleoperator can shift the virtual viewpoint to any preferred observation position, inside and also outside the motor vehicle, which significantly simplifies navigation of the motor vehicle out of an accident situation or navigation of the motor vehicle 2 during parking manoeuvres.

The invention claimed is:
1. A method for assisting a user in the remote control of a motor vehicle by a remote-control device, comprising:
receiving, by the remote-control device from the user in proximity of the remote-control device and remote from the motor vehicle, a user input that specifies a point in a three-dimensional (3D) vehicle model of the motor vehicle, wherein the point in the 3D vehicle model corresponds to an interior location within the motor vehicle;

depending on sensor data provided by at least one environment sensor of the motor vehicle, providing a first surroundings image of at least one part of the surroundings of the motor vehicle viewed from the interior location of the motor vehicle as a determined perspective, wherein the determined perspective is represented by using the point in the 3D vehicle model as a virtual viewpoint, wherein the first surroundings image comprises the sensor data and an interior portion of the 3D vehicle model;

displaying, while the remote-control device and the user are remote from the motor vehicle, the first surroundings image by the remote-control device to be viewed by the user as if the user is at the interior location within the motor vehicle; and selecting the determined perspective from a plurality of selectable perspectives as a perspective that is independent of a position of the at least one environment sensor, depending on the user input effected by the user and detected by the remote-control device, wherein the remote control of the motor vehicle is carried out independently of a distance between the remote-control device and the motor vehicle.

2. The method according to claim 1, wherein depending on the selected perspective a view window on a defined projective surface is determined and the first surroundings image is calculated as part of a 3D all-round view around the motor vehicle, said 3D all-round view being able to be provided from the sensor data, depending on the determined view window on the defined projective surface, such that the first surroundings image represents the part of the surroundings that lies within the view window from the selected perspective.

3. The method according to claim 2, wherein the projective surface constitutes a curved surface.

4. The method according to claim 1, wherein a second virtual viewpoint assigned to a second perspective is freely selectable on one or a plurality of predetermined lines or in three-dimensional space.

5. The method according to claim 4, wherein the second virtual viewpoint assigned to the second perspective is selectable inside the motor vehicle and outside the motor vehicle.

6. The method according to claim 1, wherein in the first surroundings image at least one part of a motor vehicle representation of the motor vehicle is represented from the selected perspective.

7. The method according to claim 1, wherein the first surroundings image is calculated from the sensor data by the motor vehicle and communicated to the remote-control device.

8. The method according to claim 1, wherein the sensor data are communicated from the motor vehicle to the remote-control device and the first surroundings image is calculated from the sensor data by the remote-control device.

9. The method according to claim 1, wherein the fact of whether the first surroundings image is calculated from the sensor data by the motor vehicle or by the remote-control device is determined depending on a type of the communication connection between motor vehicle and remote-control device and/or a bandwidth and/or a data transfer rate of the data transfer between motor vehicle and remote-control device.

10. The method according to claim 8, wherein when the bandwidth of the communication connection and/or the data transfer rate of the communication connection between motor vehicle and remote-control device fall(s) below a predetermined limit value, the first surroundings image is calculated from the sensor data by the motor vehicle and communicated to the remote-control device, and when the bandwidth of the communication connection and/or the data transfer rate of the communication connection between motor vehicle and remote-control device do(es) not fall below the predetermined limit value, the sensor data are communicated to the remote-control device and the first surroundings image is calculated from the sensor data by the remote-control device.

11. The method according to claim 1, wherein depending on the sensor data at least one second surroundings image from a second perspective is provided and displayed simultaneously with the first surroundings image by the remote-control device.

12. A computer program product, comprising instructions which, when executed by a processor of an electronic control device, cause said processor to carry out a method according to claim 1.

13. A remote-control device for assisting a user in the remote control of a motor vehicle, wherein the remote-control device is configured to receive, from the user in proximity of the remote-control device and remote from the motor vehicle, a user input that specifies a point in a three-dimensional (3D) vehicle model of the motor vehicle, wherein the point in the 3D vehicle model corresponds to an interior location within the motor vehicle;

depending on sensor data provided by at least one environment sensor of the motor vehicle, obtain a first surroundings image of at least one part of the surroundings of the motor vehicle viewed from the interior location of the motor vehicle as a determined perspective, wherein the determined perspective is represented by using the point in the 3D vehicle model as a virtual viewpoint, wherein the first surroundings image comprises the sensor data and an interior portion of the 3D vehicle model;

displaying, while the remote-control device and the user are remote from the motor vehicle, the first surroundings image by the remote-control device to be viewed by the user as if the user is at the interior location within the motor vehicle; and select the determined perspective from a plurality of selectable perspectives as a perspective that is independent of a position of the at least one environment sensor, depending on the user input effected by the user and detected by the remote-control device, wherein the remote control of the motor vehicle is carried out independently of a distance between the remote-control device and the motor vehicle.

14. A driver assistance system for a motor vehicle for assisting a user in the remote control of the motor vehicle by a remote-control device, wherein the driver assistance system is configured, depending on sensor data provided by at least one environment sensor of the motor vehicle, to:

provide a surroundings image of at least one part of the surroundings of the motor vehicle from a determined perspective and to communicate the surroundings image to the remote-control device for displaying, while the remote-control device and the user are remote from the motor vehicle, the surroundings image to be viewed by the user as if the user is at an interior location within the motor vehicle;

receive from the remote-control device selection information dependent on a user input effected by the user and detected by means of the remote-control device and, depending on the received selection information, to select the determined perspective from a plurality of selectable perspectives as a perspective that is independent of a position of the at least one environment sensor, wherein the user input is received by the remote-control device from the user in proximity of the remote-control device and remote from the motor vehicle, wherein the user input specifies a point in a three-dimensional (3D) vehicle model of the motor vehicle, wherein the point in the 3D vehicle model corresponds to the interior location within the motor vehicle, wherein the surroundings image corresponds to the at least one part of the surroundings of the motor vehicle viewed from the interior location of the motor vehicle as the determined perspective, wherein the determined perspective is represented by using the point in the 3D vehicle model as a virtual viewpoint, wherein the surroundings image comprises the sensor data and an interior portion of the 3D vehicle model, and wherein the remote control of the motor vehicle is carried out independently of a distance between the remote-control device and the motor vehicle.

* * * * *